UNITED STATES PATENT OFFICE.

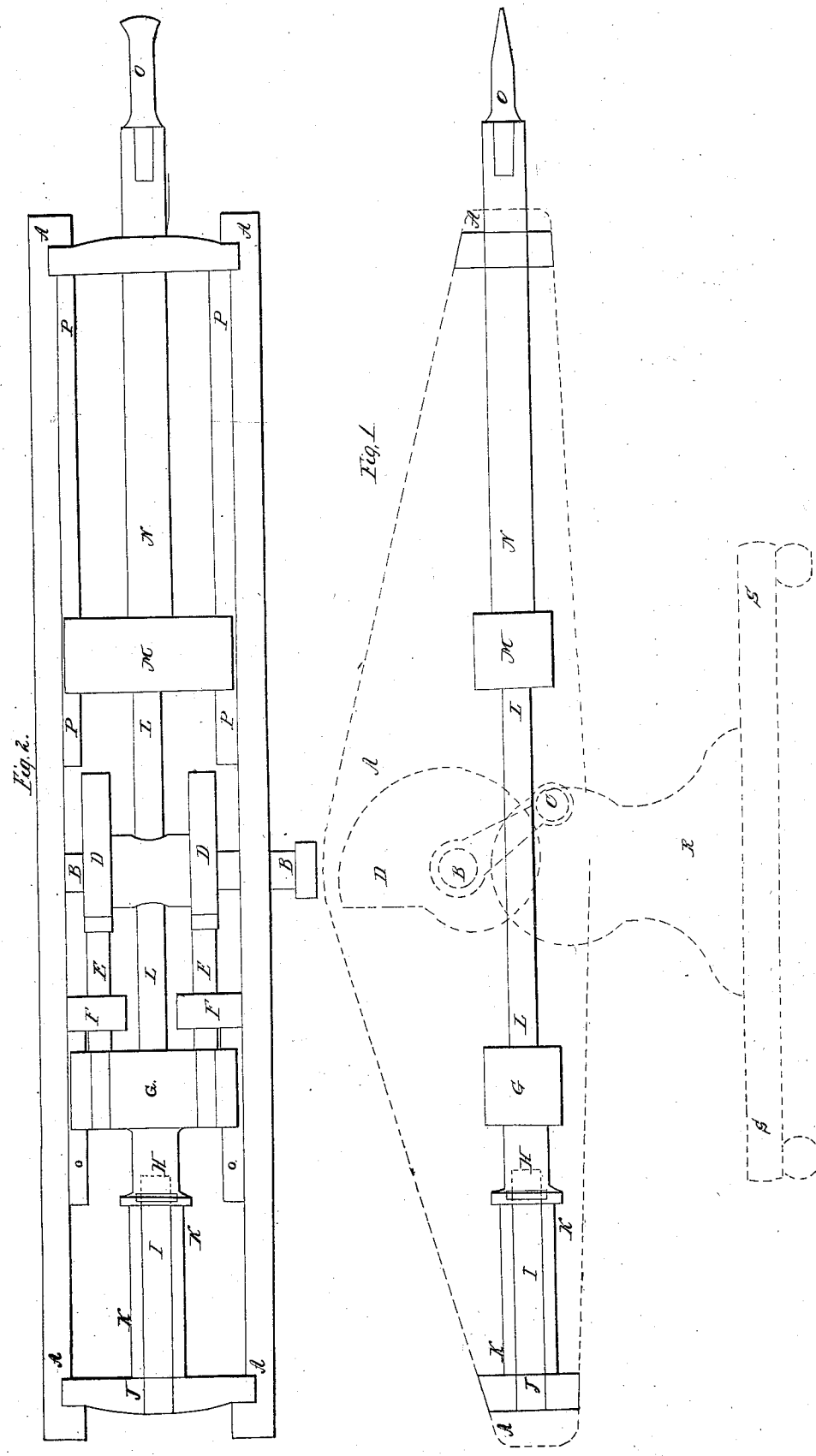

LEMUEL P. JENKS, OF BOSTON, MASSACHUSETTS, ASSIGNOR TO GEO. A. GARDNER, OF SAME PLACE.

ROCK-DRILLING MACHINE.

Specification forming part of Letters Patent No. 17,765, dated July 7, 1857; antedated January 7, 1857.

*To all whom it may concern:*

Be it known that I, LEMUEL P. JENKS, of the city of Boston, county of Suffolk, and State of Massachusetts, have invented a new Mode of Effecting Percussion with Rock-Drills; and I do hereby declare that the following is a full and exact description thereof, reference being had to the accompanying drawing and to the letters of reference marked thereon.

The nature of my invention consists in the use and application of india rubber springs when interposed in such manner that their expansive force shall operate the drill in rock-drilling machines.

To enable others to make and use my invention, I will proceed to describe its construction and operation, promising that I do not confine myself to any particular form of drill.

In the drawings annexed, Figure 1 is a view from the side with parts I, J, and K in section, for the better understanding thereof, and Fig. 2 is a view from above, same parts also in section.

A, A, A, Fig. 1, shown by the dotted lines, is the side view of a frame, which frame is represented also as seen from above at A, A, A, Fig. 2. Sometimes I have this frame horizontally placed and sometimes perpendicularly, and sometimes I swing it so as to place it in any position desired.

B, Fig. 1 and B, B, Fig. 2 represents a shaft passing from one side to the other of the frame.

C Fig. 1 is the handle or crank, turning the shaft B.

D Fig. 1, and D, D, Fig. 2 are the cams on the cam shaft B.

E, E, Fig. 2 are two bars or pins passing through two bearings or boxes F, F, on each of the sides of the frame A, A, A, inside into a crosshead G (Figs. 1 and 2). This first crosshead G bears at its upper end a cylindrical plunger H (Figs. 1 and 2) which plunger has a cylindrical cavity in its center indicated by red lines.

I (Figs. 1 and 2) indicated by dotted lines, is a spindle fixed tightly in the upper head piece J (Figs. 1 and 2) of the frame A, A, A. The spindle bears a spring K, K, Figs. 1 and 2, composed of india rubber. The 1st cross head G also bears L, L, (Figs. 1 and 2) which is intended to represent a screw or screw shaft, turning loosely in G and passing through a second crosshead M (Figs. 1 and 2) and into the mandrel N (Figs. 1 and 2). This mandrel N is borne by the crosshead M and bears at its lower end the drill O (Figs. 1 and 2).

P, P, P, P (Fig. 2) are the projections on the inside of the frame A, A, A, fitting in the sides of the crosshead M on which the crosshead slides.

Q, Q (Fig. 2) are the projections on the inside of the frame A, A, A, fitting in the sides of the 1st crosshead G, on which the said 1st crosshead slides.

The mandrel N and the screen shaft L, are rotated by separate contrivances, which as they may be varied at pleasure, it has not been thought necessary to represent in the drawing.

R (Fig. 1) with its opposite, is the support of the frame A, A, A.

S, S (Fig. 1) is the platform (side view) on which the supports R (with its opposite) stands.

The operation of the machine is as follows. The shaft B being rotated by the crank C (or by any other convenient method) the cams D, D (Fig. 2) press against the end of the two bars or pins E, E (Fig. 2) thus pushing back toward the upper end of the frame A, A, A, the 1st crosshead G (Fig. 2) and the plunger H (Fig. 2) attached thereto (the spindle I passing into the cylindrical cavity in the plunger) thus compressing the india rubber spring K (Figs. 1 and 2). The rotation of the cam shaft B leaving at the proper point the end of the bars or pins E, E (Fig. 2) unopposed, the compressed spring of india rubber K (Figs. 1 and 2) expanding, propels the plunger H, with the 1st crosshead G and its attachments—the screw shaft L (Fig. 2) the 2d crosshead M (Figs. 1 and 2) the mandrel N (Figs. 1 and 2) with the drill O (Figs. 1 and 2)—with great force against the stone or rock operated on. The rotation of the cam shaft B (Figs. 1 and 2) continuing, the percussive operation is repeated.

I do not claim the invention of india rubber springs, neither do I claim the use of metallic springs in rock-drilling machines, but,

What I claim, and desire to secure by Letters Patent is—

5 The use and application of the india rubber K when interposed in such manner that its expansive force shall operate the drill in rock-drilling machinery, substantially as described.

LEML. P. JENKS.

Witnesses:
FRAS. A. BROOKS,
J. M. PINKERTON.